US012269411B2

(12) United States Patent
Fatemi

(10) Patent No.: US 12,269,411 B2
(45) Date of Patent: Apr. 8, 2025

(54) VEHICLE WITH A HEAD AIRBAG INTEGRATED INTO THE VEHICLE BODY

(71) Applicant: Volkswagen Aktiengesellschaft, Wolfsburg (DE)

(72) Inventor: Akbar Fatemi, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 300 days.

(21) Appl. No.: 17/949,800

(22) Filed: Sep. 21, 2022

(65) Prior Publication Data

US 2023/0091811 A1 Mar. 23, 2023

(30) Foreign Application Priority Data

Sep. 22, 2021 (DE) ..................... 10 2021 210 517.3

(51) Int. Cl.
*B60R 21/213* (2011.01)
*B60Q 3/51* (2017.01)
*B60R 13/02* (2006.01)
*B60R 21/215* (2011.01)
*B60R 21/00* (2006.01)

(52) U.S. Cl.
CPC .............. *B60R 21/213* (2013.01); *B60Q 3/51* (2017.02); *B60R 13/0206* (2013.01); *B60R 13/0225* (2013.01); *B60R 21/215* (2013.01); *B60R 2013/0287* (2013.01); *B60R 2021/0048* (2013.01)

(58) Field of Classification Search
CPC . B60R 21/213; B60R 21/232; B60R 13/0212; B60R 13/0225; B60R 13/0206; B60R 21/215; B60Q 3/51
See application file for complete search history.

(56) References Cited

U.S. PATENT DOCUMENTS

| 7,240,914 B1 | 7/2007 | Kamano |
| 8,827,516 B2 | 9/2014 | Stakoe et al. |
| 9,278,656 B2 | 3/2016 | Boroel et al. |
| (Continued) | | |

FOREIGN PATENT DOCUMENTS

| DE | 102007003535 A1 | 8/2007 |
| DE | 202006020661 U1 | 7/2009 |
| (Continued) | | |

OTHER PUBLICATIONS

Office Action for Korean Patent Application 1020220120076 mailed on Nov. 7, 2024.

*Primary Examiner* — Daniel J Colilla
(74) *Attorney, Agent, or Firm* — Muncy, Geissler, Olds & Lowe, P.C.

(57) ABSTRACT

A vehicle with a head airbag integrated into the vehicle body, which is covered so as to be visually screened by a headliner that has a headliner opening for a functional component, in particular a reading light, wherein a fastening arrangement is provided on the reverse side of the headliner facing away from a passenger compartment, via which the functional component is secured. At least one shield element is associated with the fastening arrangement and is arranged between the head airbag and the fastening arrangement in a head airbag deployment direction, so that when an airbag deploys, a region of the fastening arrangement having interfering contours is shielded against the deploying head airbag.

10 Claims, 4 Drawing Sheets

(56) References Cited

U.S. PATENT DOCUMENTS

| | | | |
|---|---|---|---|
| 9,623,812 B2 | 4/2017 | Sakurai et al. | |
| 11,007,966 B2* | 5/2021 | Kakimoto | B60R 21/213 |
| 2013/0292926 A1* | 11/2013 | Kim | B60R 21/213 |
| | | | 280/728.2 |
| 2016/0052558 A1 | 2/2016 | Sakurai et al. | |
| 2018/0257599 A1* | 9/2018 | Sato | B60R 21/213 |
| 2021/0094384 A1 | 4/2021 | Astrike et al. | |

FOREIGN PATENT DOCUMENTS

| | | |
|---|---|---|
| DE | 102012220942 A1 | 6/2013 |
| DE | 102015215215 A1 | 2/2016 |
| JP | 2001058555 A | 3/2001 |
| JP | 2009143531 A | 7/2009 |
| JP | 2009274581 A | 11/2009 |
| JP | 20213063779 A | 4/2013 |
| JP | 201643739 A | 4/2016 |

* cited by examiner

VEHICLE WITH A HEAD AIRBAG INTEGRATED INTO THE VEHICLE BODY

This nonprovisional application claims priority under 35 U.S.C. § 119(a) to German Patent Application No. 10 2021 210 517.3, which was filed in Germany on Sep. 22, 2021, and which is herein incorporated by reference.

BACKGROUND OF THE INVENTION

Field of the Invention

The present invention relates to a vehicle with a head airbag integrated into the vehicle body.

Description of the Background Art

In common practice, the body or bodyshell structure of a two-track vehicle has a roof frame, which is constructed of roof frame longitudinal members (which is to say roof frame side sections) and of roof frame cross members. Body-mounted on the roof frame side sections are various additional components, such as mounts for the head airbag or suspension parts for suspending a net partition rod.

In a generic vehicle, a head airbag that is integrated into the vehicle body is covered so as to be visually screened by a headliner. The latter has a headliner opening for a functional component, in particular a reading light. A fastening arrangement is provided on the reverse side of the headliner facing away from a passenger compartment, by means of which the functional component is secured.

In the event of a head airbag activation, the deploying head airbag presses against the headliner in such a manner that the latter swings open into the passenger compartment with lateral deformation. As a result, the head airbag can deploy downward in the vertical direction of the vehicle into the passenger compartment.

In order to provide adequate crash safety for the vehicle occupants, it is necessary for the deployment path of the deploying head airbag to be purposefully oriented downward toward the passenger compartment in the event of head airbag activation.

A vehicle with a head airbag integrated into the vehicle body, which is covered so as to be visually screened by a headliner, is known from U.S. Pat. No. 9,278,656 B2. Formed in the headliner is a ventilation opening, which is shielded from the head airbag by a protective shield. Another vehicle with a head airbag integrated into the vehicle body is known from DE 20 2006 020 661 U1, which is incorporated herein by reference.

SUMMARY OF THE INVENTION

It is therefore an object of the present invention to provide a vehicle in which faultless and crash-safe head airbag deployment in the event of a crash is ensured in a structurally simple manner.

An exemplary embodiment of the invention is based on a vehicle with a head airbag integrated into the vehicle body, which is covered so as to be visually screened by a headliner. The headliner has a headliner opening for a functional component, in particular a reading light. Provided on the reverse side of the headliner facing away from a passenger compartment is a fastening arrangement, by means of which the functional component is secured. The fastening arrangement projects by a profile depth from the reverse side of the headliner. At least one shield element is associated with the fastening arrangement. The shield element is positioned between the head airbag and the fastening arrangement in a head airbag deployment direction. In this way, when an airbag deploys, a sharp-edged region of the fastening arrangement is shielded against the deploying head airbag, thus ensuring a faultless and crash-safe head airbag deployment.

The fastening arrangement can have a mounting frame that is connected to the reverse side of the headliner. The mounting frame can surround the headliner opening and/or the functional component in a frame-like manner. The functional component can be secured on the mounting frame with the aid of a spring element. By way of example, the spring element can have a sheet metal part with sharp, cut edges that is produced by sheet-metal forming. In this case, the shield element can specifically shield the sharp-edged regions on the spring element.

The mounting frame can be in an adhesive-bonded joint with the reverse side of the headliner, for example. For stable retention of the functional component, the mounting frame can have, in cross-section, an outer connecting flange that is connected to the reverse side of the headliner. This flange transitions at an inner transition edge to a mounting leg projecting therefrom. The mounting leg of the mounting frame delimits a mounting shaft into which the functional component can be inserted in the direction of the passenger compartment in a placement process. After the placement process has occurred, the functional component is in contact with an end position stop. The spring element causes the functional component to be secured in place. For this purpose, the spring element preloads the functional component with a spring force in the direction of the end position stop.

As mentioned above, the spring element can be made of a sheet metal part. Alternatively, the spring element can also be implemented as a plastic part. The spring element can have a body that at least partially covers the mounting shaft of the mounting frame. In the assembled state, the spring element body presses the functional component against the end position stop with the spring force. The spring element body is extended laterally outward with at least one spring arm. This arm transitions into a latching web that is angled therefrom. The latching web of the spring arm encloses the mounting leg on the outside and is in latching engagement with a latching contour formed on the outside of the mounting leg. It has become apparent that specifically the spring arm of the spring element can constitute an interfering contour for the deploying head airbag under certain conditions. Against this background, the shield element can, in particular, shield the spring arm of the spring element against the deploying head airbag.

The shield element can be molded on the mounting frame as a protective rib from the same material and as a single piece. The protective rib can preferably be formed on the connecting flange of the mounting frame. Moreover, the shield element can be spaced apart from, in particular in alignment with, the latching contour formed on the outside of the mounting leg, by a latching clearance. In this way, a latching process of the spring element can be carried out free of interfering contours. Moreover, in the latched state, the latching web of the spring element is located inside the latching clearance between the shield element and the mounting leg of the mounting frame.

With regard to easy spring element installation, the mounting leg latching contour can be an outward-protruding latching projection that can be brought into latching engagement with a latching recess formed in the latching web of the spring arm. For smooth installation of the spring element, the latching projection can have a guide bevel that interacts with an outwardly turned starting edge of the latching web during spring element installation.

During spring element installation, the spring element body is first brought into contact with the functional component inserted in the mounting frame. Then the latching web of the spring arm of the spring element is pressed into the latching clearance between the shield element and the mounting leg of the mounting frame. This takes place with build-up of the spring force acting on the functional component. During installation of the spring element, the starting edge of the latching web slides along the guide bevel of the latching projection, namely with elastic deformation of the latching web. Once the latching projection has been passed, the latching web springs back in the direction of the undeformed state and the latching recess in the latching web comes into latching engagement with the mounting leg latching projection.

The fastening arrangement of the functional component may be spaced apart from the body structure of the vehicle by a free distance, which is to say has no connection to the body structure. The end position stop can be implemented by means of a frame-like functional component bezel. This bezel can have, viewed in cross-section, a support leg that is supported on the visible side of the headliner at the edge region of the headliner opening in the assembled position. The support leg of the functional component bezel can transition at an inner transition edge to a latching leg angled therefrom. In the assembled state, the latching leg is in latching engagement with a latching contour formed on the inside of the mounting leg. The support leg of the functional component bezel can be extended inward beyond the latching leg with an overhang. In this way, the overhang forms the end position stop for the functional component.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
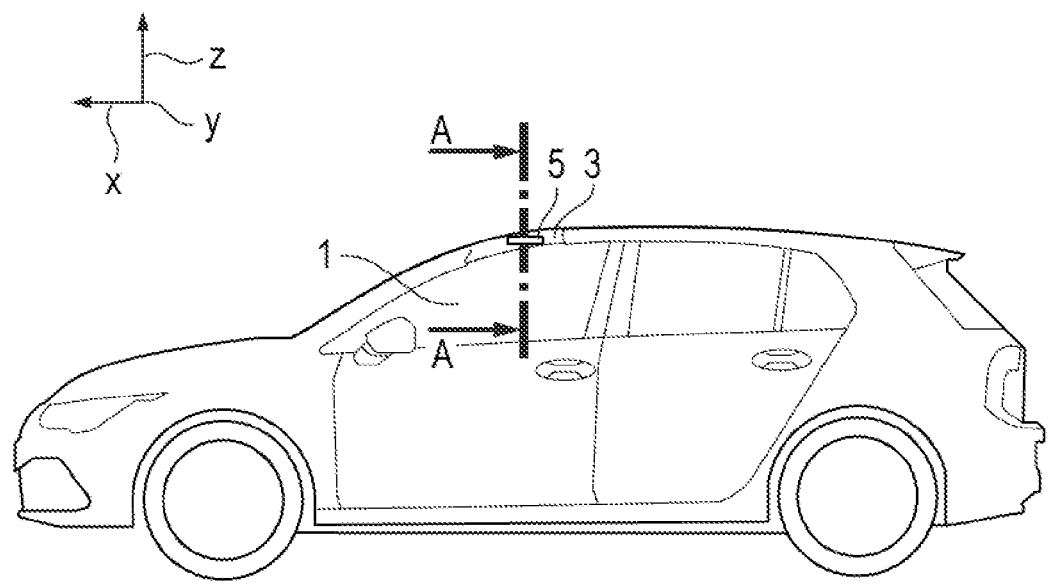
FIG. 1 shows a two-track vehicle in a side view with a partial section showing a reading light in the installed position.

Shown in FIG. 1 is a side view of a two-track vehicle whose passenger compartment 1 is bounded toward the vehicle top by a headliner 3. In the region of the front seat, a side reading light 5 is installed in the headliner 3 approximately above the door opening on the body side. This reading light 5 is secured on the headliner 3 with the aid of a fastening arrangement 7, which is described below on the basis of FIGS. 3 to 5. Accordingly, the fastening arrangement 7 has a mounting frame 9 that is connected to the reverse side 11 of the headliner (by adhesive bonding, for example). The mounting frame 9 has, in cross-section, an outer connecting flange 13 that is adhesive-bonded to the reverse side 11 of the headliner and that transitions at an inner transition edge to a mounting leg 17 projecting therefrom. The mounting leg 17 of the mounting frame 9 delimits a mounting shaft, into which the functional component 5 is inserted in the direction of the passenger compartment 1 in a placement process S (FIG. 3), namely until it is in contact with an end position stop 21, which is molded on a reading light bezel 23. The reading light bezel 23 is designed in the manner of a frame and has, when viewed in cross-section, a support leg 25 that is supported on the visible side 27 of the headliner at the edge region of a headliner opening 29. At an inner transition edge, the support leg 25 transitions to a latching leg 33 angled therefrom, which in FIGS. 3 and 4 is in latching engagement with a latching contour 35 formed on the inside of the mounting leg 17 of the mounting frame 9.

Figure 3:
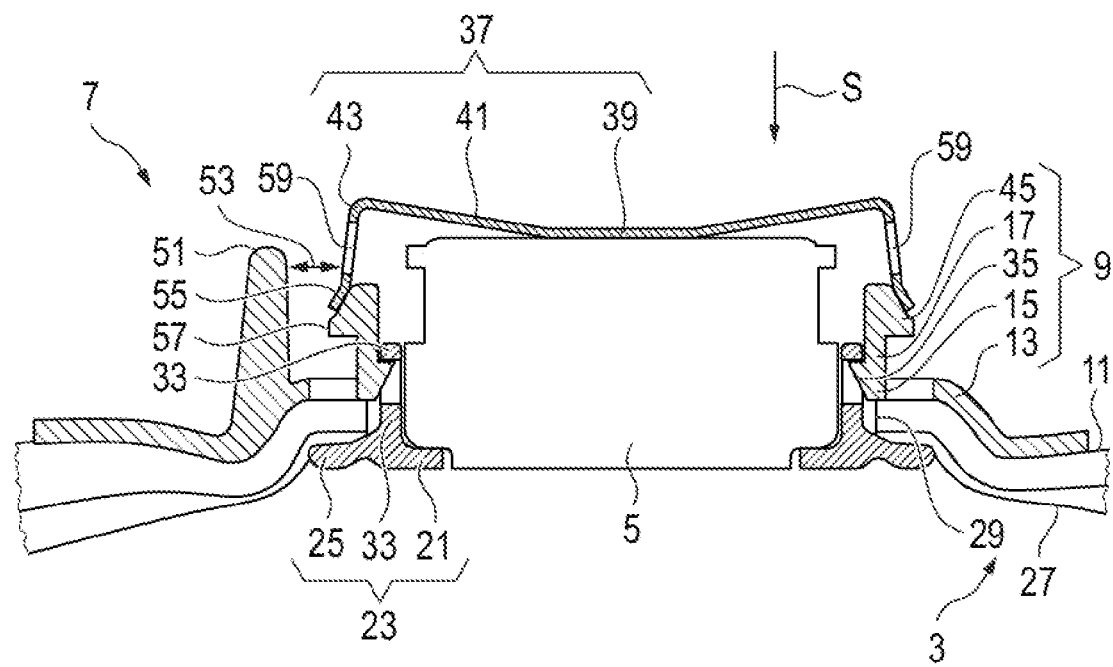
FIGS. 3 and 4 show sectional representations of the fastening arrangement of the reading light in an intermediate assembly position (FIG. 3) and in a final assembly position (FIG. 4)
Figure 4:
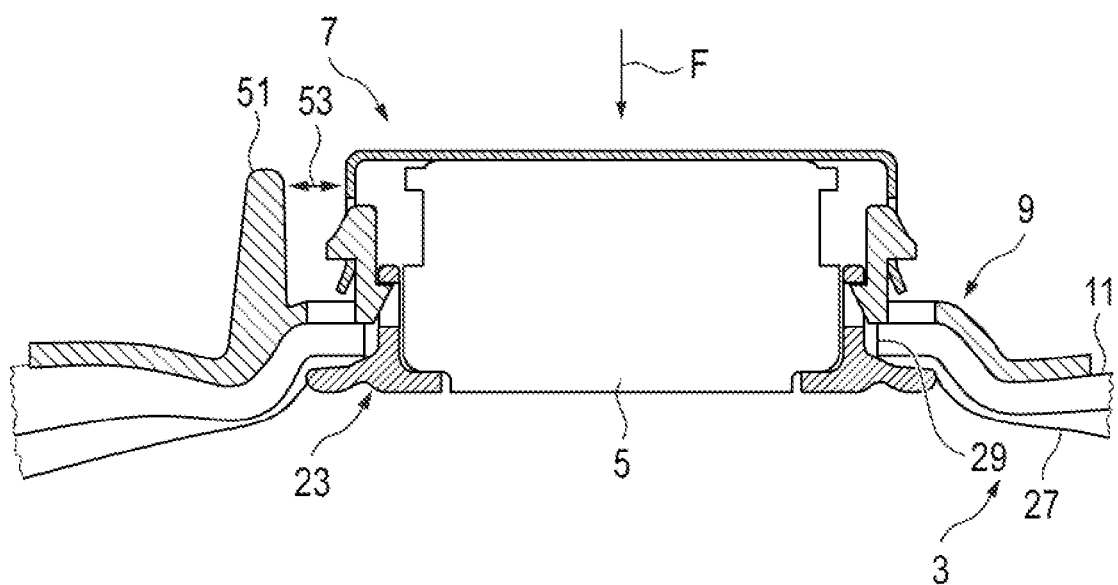

According to FIG. 3, the support leg 25 of the reading light bezel 23 is extended inward beyond the latching leg 33 with an overhang that forms the end position stop 21.

Figure 5:
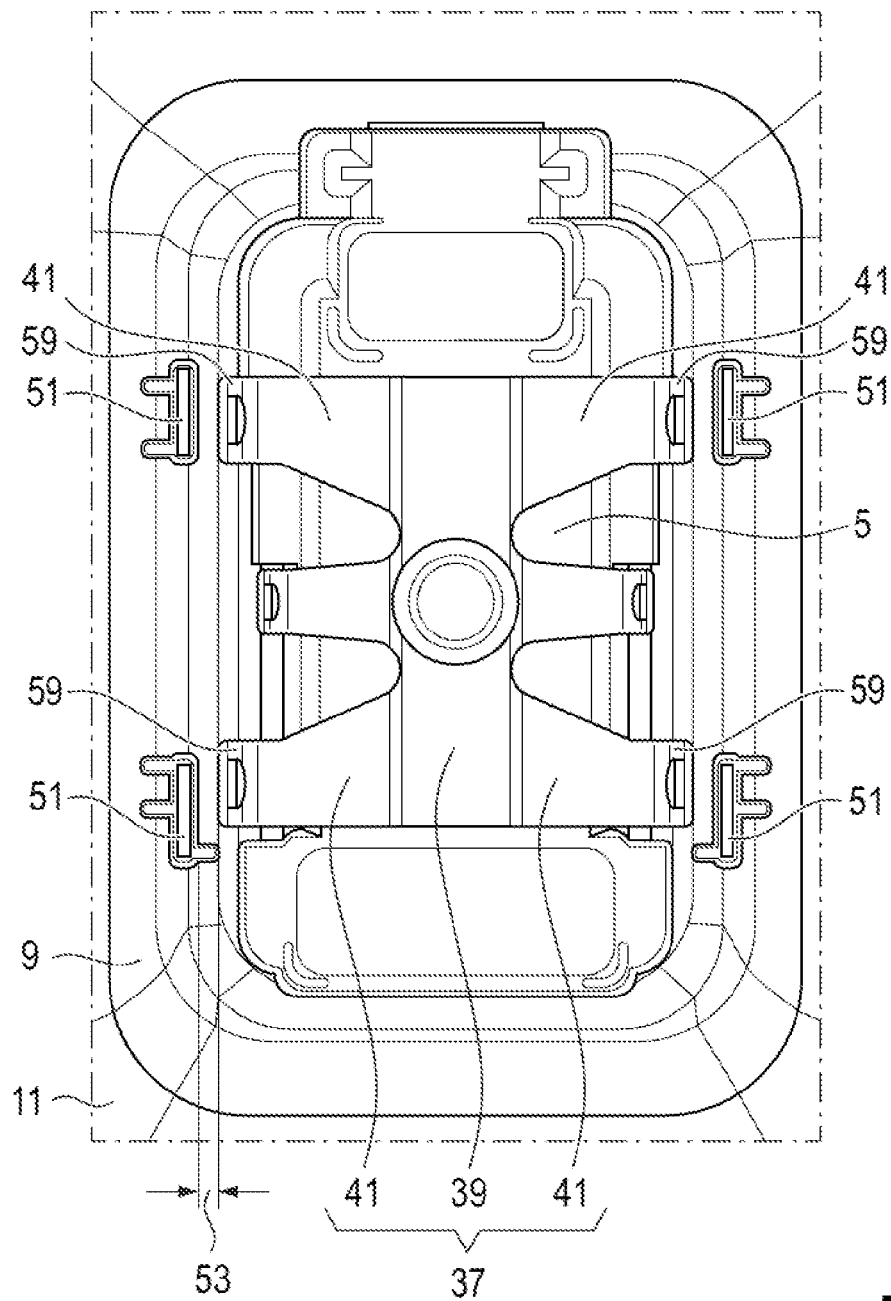
FIG. 5 shows the fastening arrangement in a view from above.

For secure positioning of the reading light 5 on the end position stop 21, the fastening arrangement 7 has a spring element 37 that preloads the reading light 5 with a spring force F in the direction of the end position stop 21. The spring element 37 can be a sheet metal part that is produced by sheet-metal forming. In FIGS. 2 to 5, the spring element 37 has a body 39 that partially covers the mounting shaft of the mounting frame 9 and presses the reading light 5 against the end position stop 21 with the spring force F. The spring element body 39 in FIG. 5 is extended laterally outward with a total of four spring arms 41 that are spaced apart from one another. Each spring arm 41 transitions into a latching web 43 that is angled therefrom and that encloses the mounting leg 17 of the mounting frame 9 on the outside. In the final assembly position (FIG. 4), the latching web 43 is in latching engagement with a latching projection 45 molded on the outside of the mounting leg 17. In FIG. 3 and in FIG. 4, in contrast, an intermediate assembly position is shown in which the starting bevels 55 of the spring element 37 are in contact with guide bevels 57 of the latching projections 45 formed on the mounting leg 17.

Figure 2:
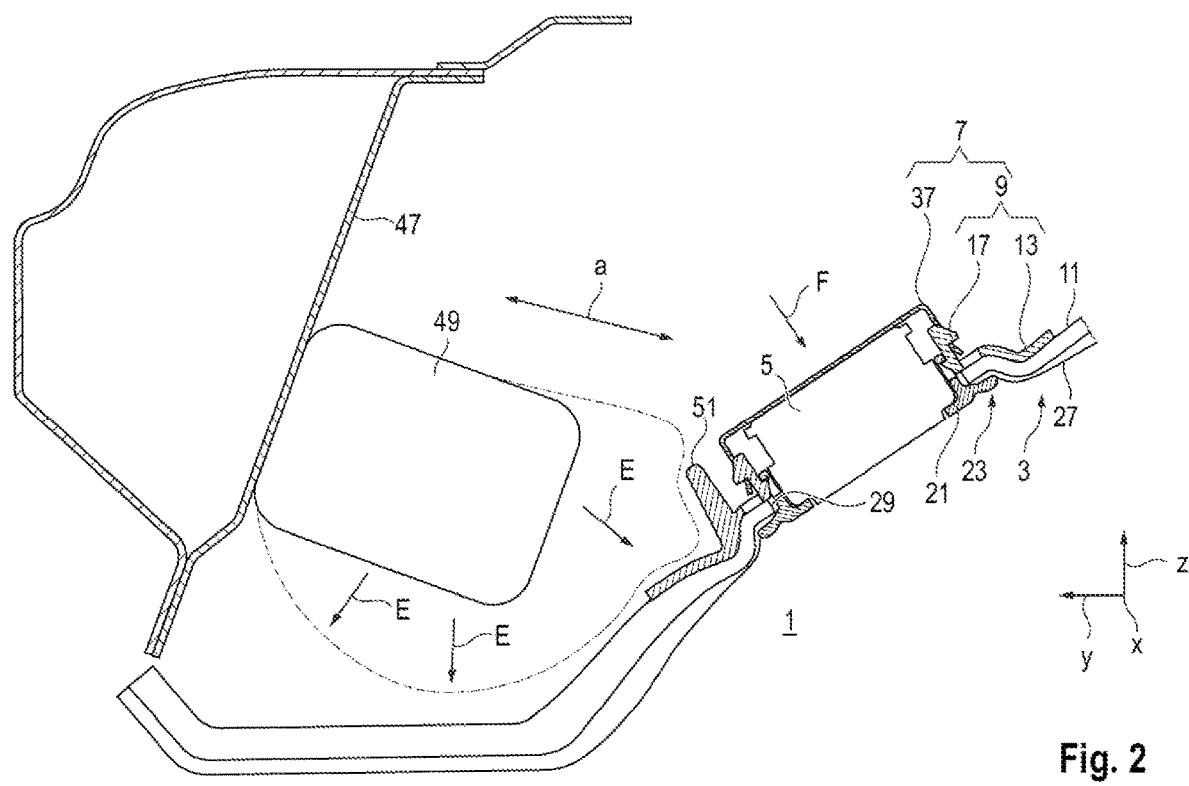
FIG. 2 shows an enlarged sectional representation along a section plane A-A from FIG. 1.

According to FIG. 2, the fastening arrangement 7 is spaced apart relative to a roof frame side section 47 on the body side by a free distance a, which is to say has no connection to the roof frame side section 47. A head airbag 49 is attached to the roof frame side section 47. In the event of a head airbag activation, the deploying head airbag 49 (indicated by a dotted-and-dashed line in FIG. 2) presses against the headliner 3 in a deployment direction E in such a manner that the latter swings open into the passenger compartment 1 with lateral deformation. As a result, the head airbag 49 can deploy downward in the vertical direction z of the vehicle into the passenger compartment 1.

In order to ensure a deployment process that is free of interfering contours, shield elements 51, which support a reliable deployment process of the head airbag 49, are associated with the fastening arrangement 7. Each of the shield elements 51 is spaced apart from the mounting leg 17 of the mounting frame 9 by a latching clearance 53. The latching clearance 53 is dimensioned such that spring element installation that is free of interfering contours is made possible. In FIGS. 2 to 4 the shield elements 51 are positioned only on the side facing the head airbag 49. In contrast, in FIG. 5 shield elements 51 are positioned both on the side facing the head airbag 49 and on the side facing away from the head airbag 49 by way of example.

For installation of the spring element, the spring element body 39 is first brought into contact with the reading light 5 that is inserted in the mounting shaft of the mounting frame 9. Then the respective latching webs 43 of the spring arms 41 of the spring element 37 are pressed into the latching clearance 53 between the shield element 51 and the mounting leg 17 of the mounting frame 9, namely with build-up of the spring force F acting on the reading light 5.

During installation of the spring element, the starting edge 55 of the respective latching web 43 slides along the guide bevel 57 of the latching projection 45, namely with outward elastic deformation of the latching web 43. Once the latching projection 45 has been passed, the latching web 43 springs back in the direction of the undeformed state, and a latching recess 59 of the latching web 43 comes into latching engagement with the latching projection 45 of the mounting leg 17.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle comprising:
a head airbag integrated into a vehicle body, the head airbag being covered so as to be visually screened by a headliner that has a headliner opening for a functional component;
a fastening arrangement arranged on a reverse side of the headliner facing away from a passenger compartment, the fastening arrangement securing the functional component; and
at least one shield element being arranged between the head airbag and the fastening arrangement in a head airbag deployment direction so that when the head airbag deploys, a region of the fastening arrangement having interfering contours is shielded against the deploying head airbag,
wherein the fastening arrangement has a mounting frame that is connected to the reverse side of the headliner and/or surrounds the headliner opening and the functional component in the manner of a frame, and wherein the functional component is secured on the mounting frame via a spring element, and wherein the region having interfering contours that is shielded by the shield element is formed on the spring element.

2. The vehicle according to claim 1, wherein the mounting frame has, in cross-section, an outer connecting flange that is connected to the reverse side of the headliner and that transitions at an inner transition edge to a mounting leg projecting therefrom, and wherein the mounting leg of the mounting frame delimits a mounting shaft into which the functional component is insertable in a direction of the passenger compartment in a placement process until the functional component is in contact with an end position stop, and wherein the spring element preloads the functional component with a spring force in the direction of the end position stop for securing in place.

3. The vehicle according to claim 2, wherein the spring element has a spring element body that at least partially covers the mounting shaft of the mounting frame and/or presses the functional component against the end position stop with a spring force, and wherein the spring element body is adapted to be extended laterally outward with at least one spring arm that transitions into a latching web that is angled therefrom, and wherein the latching web of the spring arm overlaps the mounting leg on an outside thereof and/or is in latching engagement with a latching projection formed on the outside of the mounting leg, and/or wherein the spring arm of the spring element constitutes the region having interfering contours that is shielded by the shield element.

4. The vehicle according to claim 3, wherein the shield element is molded on the mounting frame as a protective rib from the same material and as a single piece on the connecting flange of the mounting frame, and/or wherein the shield element is spaced apart from and in alignment with the latching projection formed on the outside of the mounting leg by a latching clearance so that a latching process of the spring element is carried out free of the interfering contours, and/or wherein the latching web of the spring element is located in the latching clearance between the shield element and the mounting leg of the mounting frame in the latched state.

5. The vehicle according to claim 4, wherein the latching projection protrudes outward and is adapted to be brought into latching engagement with a latching recess formed in the latching web of the spring arm, and wherein the latching projection has a guide bevel that interacts with an outwardly turned starting edge of the latching web during spring element installation.

6. The vehicle according to claim 5, wherein, for the spring element installation, the spring element body is brought into contact with the functional component inserted in the mounting frame, and then the latching web of the spring arm of the spring element is pressed into the latching clearance between the shield element and the mounting leg of the mounting frame with build-up of the spring force acting on the functional component.

7. The vehicle according to claim 6, wherein, during the spring element installation, the starting edge of the latching web slides along the guide bevel of the latching projection with elastic deformation of the latching web, and wherein, once the latching projection has been passed, the latching web springs back in the direction of the undeformed state and the latching recess of the latching web comes into latching engagement with the latching projection of the mounting leg.

8. The vehicle according to claim 2, wherein the end position stop is implemented in a frame-like functional component bezel, and wherein the functional component bezel has, in cross-section, a support leg that is supported on a visible side of the headliner at the edge region of the headliner opening, and wherein the support leg transitions at an inner transition edge to a latching leg angled therefrom that is in latching engagement with a latching contour formed on an inside of the mounting leg, and wherein the support leg of the functional component bezel is extended inward beyond the latching leg with an overhang, and wherein the overhang forms the end position stop.

9. The vehicle according to claim 1, wherein the spring element is a sheet metal part with sharp, cut edges that is produced by sheet-metal forming.

10. The vehicle according to claim 1, wherein the functional component is a reading light.

\* \* \* \* \*